Nov. 15, 1927.  
G. F. FENNO  
1,649,342  
FEED WATER REGULATOR FOR STEAM BOILERS  
Filed Dec. 29, 1923  
3 Sheets-Sheet 1

WITNESS:  
Robt P Kitchel.

INVENTOR  
George F. Fenno  
BY  
Augustus B. Stoughton,  
ATTORNEY.

Nov. 15, 1927.

G. F. FENNO 1,649,342

FEED WATER REGULATOR FOR STEAM BOILERS

Filed Dec. 29, 1923   3 Sheets-Sheet 2

WITNESS:

INVENTOR

George F. Fenno

BY Augustus B. Stoughton.

ATTORNEY.

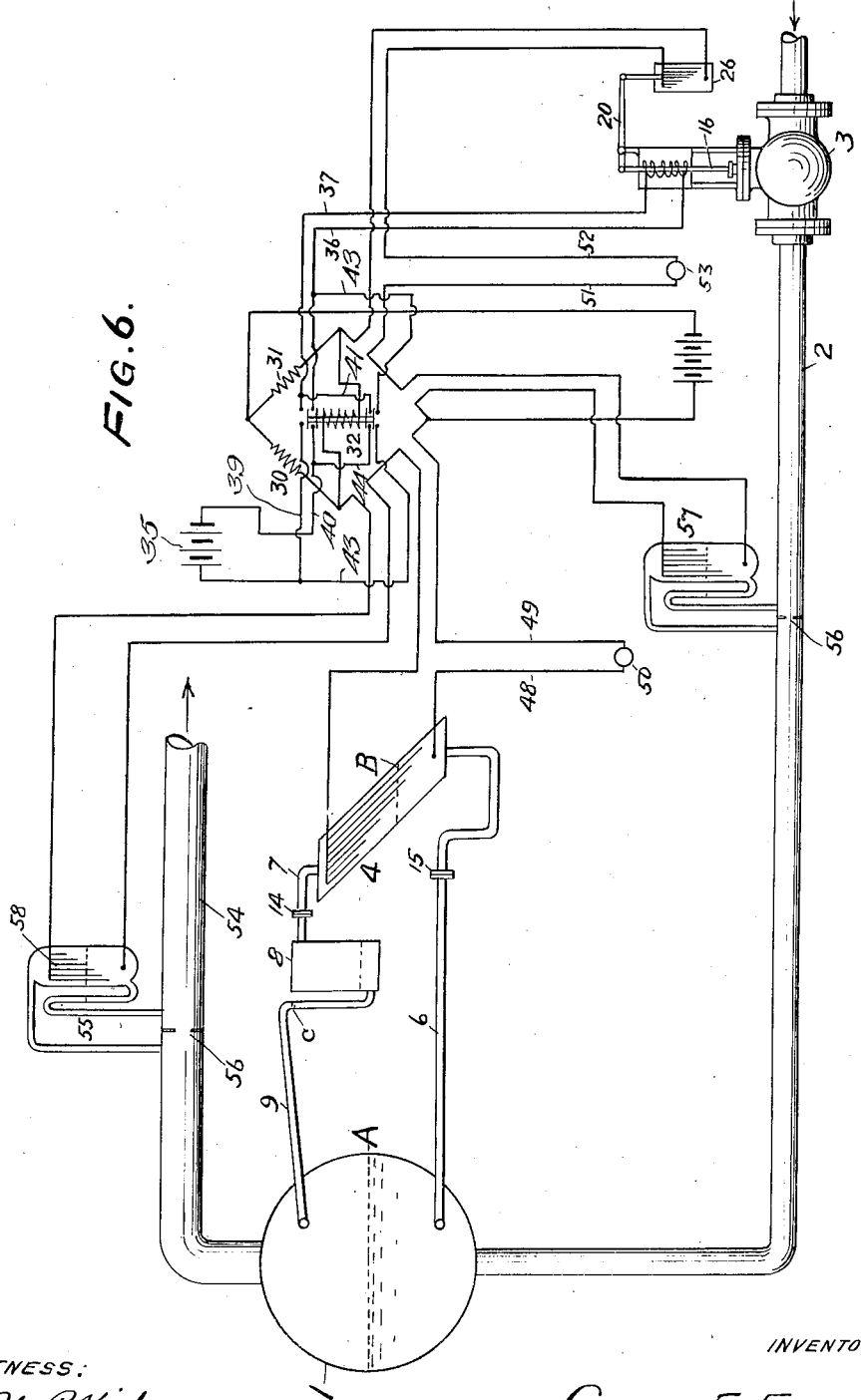

Patented Nov. 15, 1927.

1,649,342

UNITED STATES PATENT OFFICE.

GEORGE F. FENNO, OF BYWOOD, PENNSYLVANIA.

FEED-WATER REGULATOR FOR STEAM BOILERS.

Application filed December 29, 1923. Serial No. 683,531.

While many types of regulators are used for automatically controlling the input of feed water to steam boilers or generators, all of these regulators use some mechanical means for operating the feed valve. However, it is usually very difficult to make the necessary mechanical connection between the operating element and the feed valve.

It is with the object of overcoming these objections and by further extending the function of the feed water regulator so that it will control the input of water to exactly compensate for the outflow of steam that the present invention was developed.

Briefly the invention consists of a resistance element located at the level of the water in the boiler. This resistance element controls an electric circuit which in turn operates the feed valve. By using an electric circuit the feed valve can be placed anywhere in the feed line and the operating current for controlling the motion of the valve conveyed through wires which can be very easily and cheaply run from the control mechanism to the feed valve.

The invention will be claimed at the end hereof and others of its objects will appear from the following description which will be given in connection with the embodiment of the invention chosen from other embodiments for the sake of illustration in the accompanying drawings forming part hereof and in which—

Fig. 6 is a diagrammatic view illustrative of a complete operative device.

Figure 1:
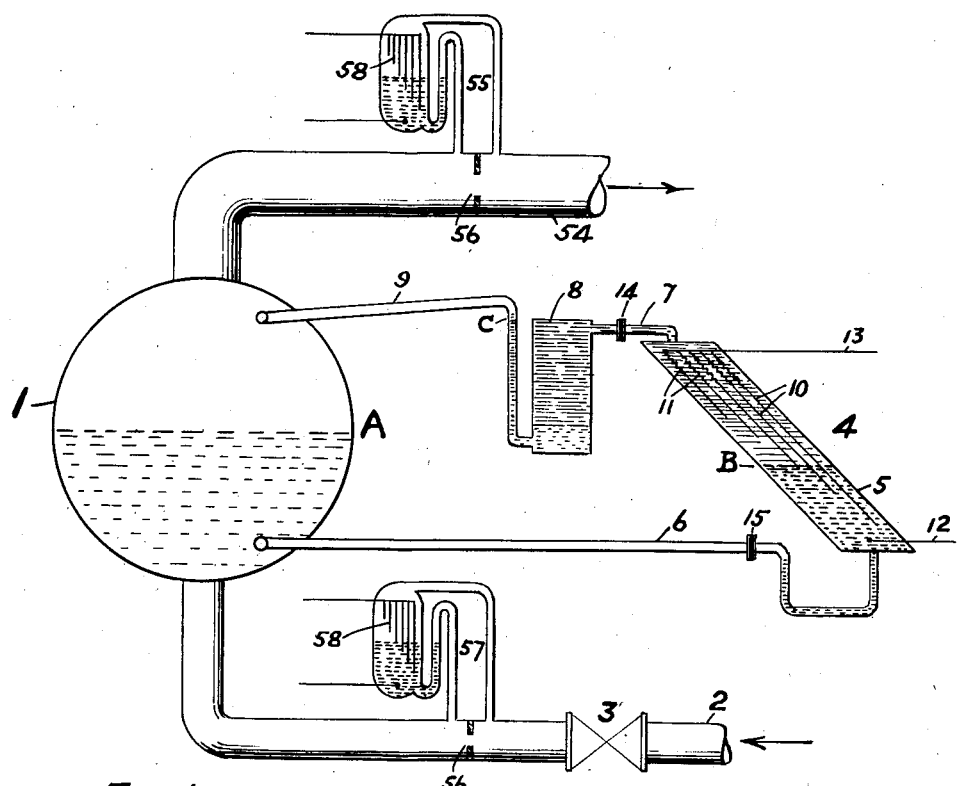
Figure 1 is a diagrammatic view illustrating among other things boiler parts and variable resistance for use in Wheatstone bridge legs shown in certain of the other figures.

In the drawings 1 is the drum of a steam boiler with the water level at the point A. The water feed to the boiler passes through pipe 2, and valve 3 (shown more in detail in Fig. 2). 4 generally is the apparatus for varying the resistance in an electrical circuit with changes in the water level. It consists of a tube 5 connected at the bottom through pipe 6 to the boiler drum at a point below the lowest water level to be carried. The upper end of tube 5 is connected by pipe 7 to chamber 8 and by means of pipe 9 to the steam space in the boiler drum. The lower end of tube 5 contains mercury which in the drawing is assumed to be at the level B. The tube 5 above the level B is filled with a non-conducting liquid such as transformer oil. Tube 5 contains a number of rods 10, of different lengths and having resistances 11, connected at the top of the contact rods. These resistances may all be of the same value or may have different values so as to change the sensitiveness of the control at any given water level. Chamber 8, which is connected to the top of tube 5 by pipe 7, also contains transformer oil, while the lower portion of this chamber contains water formed by the condensation of steam in the vertical portion of pipe 9. Pipe 9 is filled with distilled water up to the level C while the lefthand portion of the pipe from the level C will be filled with steam as any condensation in this part would drain back to the boiler.

Tube 5 is part of a Wheatstone bridge and an electric current flows to it through wires 12 and 13, wire 12 being connected directly to the body of the tube which is of metal, while wire 13 is insulated from the body of the tube and connected only to the ends of the resistances 11. Insulators 14 and 15 serve to insulate the tube 5 and its enclosed mechanism from the rest of the apparatus.

As the water level A in the boiler drum assumes different vertical positions, the level B between the oil and the mercury will move in consonance with it due to the variation in the hydrostatic head of the water in the boiler drum. Both ends of apparatus 5 are connected to the same drum and therefore are not influenced by any variations in the absolute pressure within the boiler drum.

As the level B of the mercury moves up and down it will cut in or out different resistance rods thus varying the resistance in proportion to the water level. While only five contact rods are shown for the purpose of illustration any number of rods can be used. As shown, the tube 5 is inclined in order to multiply the movement of the mercury along its axis due to changes in the hydrostatic head in the boiler.

Figure 2:
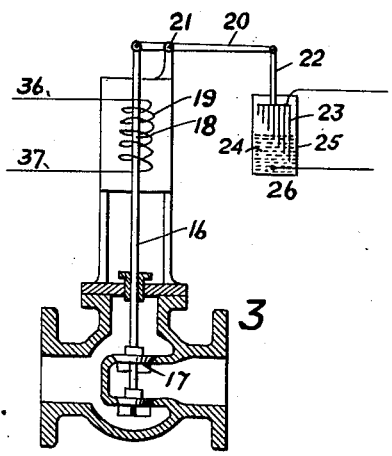
Fig. 2 is a sectional view of a valve indicated in Fig. 1 and of resistance useful for the same purpose.

Figure 2 in general shows the design of the feed valve. The valve body and movable valve piston are the ordinary design commonly known as balanced valves. The stem 16 moves vertically and controls the position of valve piston 17 which regulates the opening through the valve and therefore the flow of water, and this stem has at its upper end a magnetized portion 18 inside of an electric coil 19, said portions 18 and 19 providing a polarized solenoid. By the application of suitable current to coil 19, movement in either direction can be given to rod 16 and thus is controlled the opening of the feed valve. The upper end of rod 16 is connected to lever 20 pivoted at 21. The outer end of lever 20 carries a rod 22 to the lower end of which is connected a number of contact rods 23 having different resistances and dipping into mercury 24 in chamber 25. The rods 23 and mercury 24 constitute a variable resistance generally designated 26.

Figure 3:
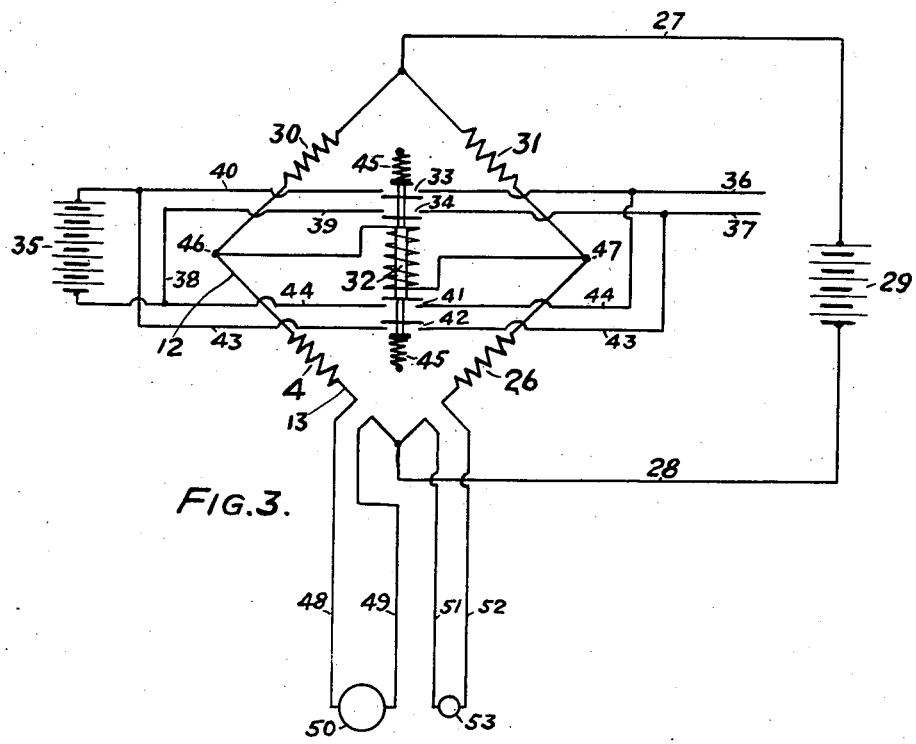
Fig. 3 is a diagrammatic and schematic view of electrical connections adapted for use in or in connection with the devices shown in Figs. 1 and 2.

In general the apparatus is connected up electrically on the well known Wheatstone bridge principle. A simplified electrical diagram is shown in Fig. 3 in which wires 27 and 28 represent the source of supply of an electric current preferably of low voltage as from a battery 29. Resistances 30 and 31 are fixed resistances and are known as ratio arms. The variable resistance 4, diagrammatically shown in Fig. 3, is introduced into the circuit, and the variable resistance 26, similarly shown in Fig. 3 is introduced into the circuit by including the same in the arms of the Wheatstone bridge. 32 is an electrical relay or polarized solenoid. If current flows through it in one direction it will close the contacts 33 and 34 at the upper end, allowing the current from the battery 35 to pass out wires 36 and 37 by way of wire 38, 39, contact 34, wire 40 and contact 33, thus energizing the coil 19 in one direction and causing it to open the feed valve. If current flows through the relay 32 in the opposite direction the contacts 41 and 42 at the bottom are closed, establishing the path 43, 42, 44, 41 and reversing the direction in which the current flows through wires 36 and 37 and through coil 19 thus causing the feed valve to close. When no current flows through coil 32 it is held in a neutral position by springs 45, and no current flows through wires 36 and 37.

According to the theory of the Wheatstone bridge if $\frac{30}{4}=\frac{31}{26}$ then the points 46 and 47 are at equal potential and no current will flow through the relay 32. If, however, the value of the resistance 4 changes due to a change in the water level which would cause variation of the resistance in tube 5, the Wheatstone bridge will become unbalanced and current will flow through the relay 32, which in turn will supply energizing current to the feed valve. However, as soon as movement is imparted to the rod 16 by means of the solenoid it immediately gives a corresponding motion to rod 22 and changes the resistance due to the contact rods 25. As soon as sufficient motion has been given to the valve, the resistance 26 will change until the relation $\frac{30}{4}=\frac{31}{26}$ is again established at which time the relay 32 will go back to neutral. It is readily apparent therefore that for every value of the resistance 4 due to the height of the water in the boiler, there will be a corresponding value for the resistance 26 depending on the degree of opening of the valve, from which it follows that for every given height of water in the boiler drum 1 there is a corresponding degree of opening for the feed valve 3 in order to satisfy the equation $\frac{30}{4}=\frac{31}{26}$.

Inasmuch as the resistance 4 is proportional to the height of water in the boiler, the current at any time flowing through this resistance will be a function of the height of the water in the boiler; therefore, by means of wires 48 and 49 this current can be passed through a galvanometer or milliammeter 50 which can be located at any convenient place in the plant and used for indicating the height of the water in the boiler.

Similarly the current flowing through the resistance 26 is proportional to the opening of the feed valve 3 and by means of wires 51 and 52 this current can be carried to another galvanometer or milliammeter 53 thus indicating the degree of opening of the valve; by mounting meters 50 and 53 close together it is possible to show at a glance the height of the water in the boiler and the degree of opening of the valve, thus enabling the operator to see if the valve is opened in proportion to the water level.

While the above represents a distinct improvement over other means for regulating the flow of water into the boiler in proportion to the height of the water in the boiler, it has the disadvantage that as a general proposition it cannot be said that the flow of water through the feed valve 3 is proportional to the amount of opening of the valve.

This is due to the fact that in practice there are always variations in the pressure in the boiler and in the water line 2 to the valve 3 and on account of these changes in the pressures on both sides of the valve the flow of water is frequently influenced very largely by the pressure difference on both sides of the valve. Therefore, a further development of the invention consists in eliminating the pressure variable and controlling directly by flow.

In Figure 1, pipe 54 is the outlet which conveys the steam away from the boiler. In this outlet pipe is installed a flow meter 55 of one of the well known types which measures the flow due to drop in pressure across a diaphragm 56. 57 is a similar meter installed in the feed line to the boiler. The meters 55 and 57 are of the general type well known in the art in which the drop in pressure across a diaphragm 56 is used to change the level of mercury in a chamber which mercury in turn makes contact with resistance rods 58 and varies the resistance of an electrical circuit in proportion to the flow, so that the elements 55 and 57 each constitute a resistance of varying value. In the diagram, Fig. 5, to resistance 4 is added resistance 55, and to resistance 26 is added resistance 57. The operation of the feed valve is the same as described above but in this case the feed valve would open or close so as to maintain a predetermined ratio between the actual flows in pipes 2 and 54.

When controlling by the flow method, as described, it is possible that due to blowing down of the boiler, popping of the safety valve, or leakage in any part of the piping system, it may happen that, over a long period even though the inflow were maintained the same as the outflow, there would be a gradual change in the water level until eventually it would either become too high or too low. Therefore, it is necessary to incorporate an element similar to tube 5 which would operate in conjunction with the flow method. This is accomplished by adding the resistance 55 to the resistance 4, and by adding the resistance 57 to the resistance 26. With this arrangement the resistance steps in tube 5 would be very much smaller than the resistance steps in element 55, so that the control of the valve 3, due to changes in the water level would be insignificant as compared to the main control due to variations in the flow. However, at the upper and lower limits of the level it is desired to maintain, the resistance steps of tube 5 would be made larger so that they would take preponderance over the resistance elements 55 and thus take control of the regulation at the high and low points.

Figures 4, 5:
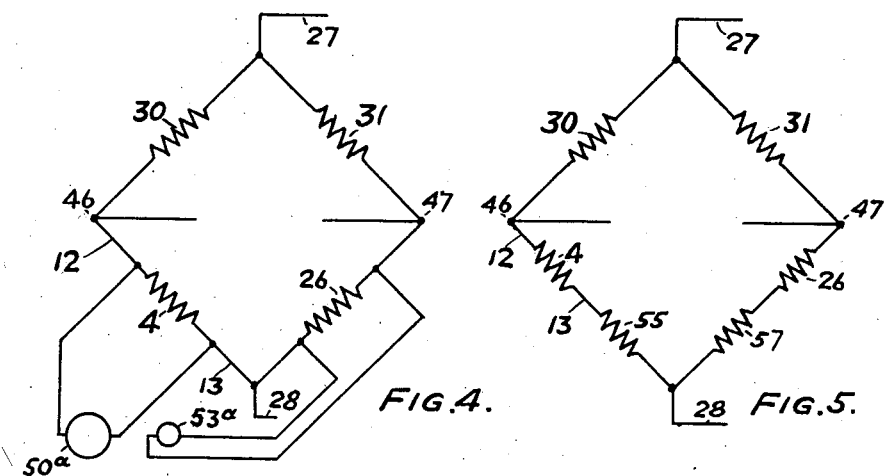
Fig. 4 is a similar view illustrating a modification.
Fig. 5 is a similar view illustrating another modification.

In this description the words "electrical current" are used in the general sense rather than the technical sense meaning "amperage". It is evident that the indicators 50ª and 53ª could be millivoltmeters and connected across the resistances 4 and 26 as shown in Fig. 4, instead of in series with them.

To those skilled in the art it will be obvious that changes can be made in details of construction and arrangement and in mere matters of form without departing from the spirit of the invention which is not limited as to those matters or otherwise than as the prior art and the appended claims may require.

I claim:

1. An automatic feed water regulator for steam boilers comprising the combination of a feed water valve, electrical means adapted to control the position of the valve, and current controlling electrically governed devices responsive to boiler demand and adapted to govern said electrical means to afford a plurality of positions of the valve in consonance with boiler demand.

2. An automatic feed water regulator for steam boilers comprising the combination of a feed water valve, an electrical system for operating the valve throughout a range of intermediate positions and including a resistance control, and electrically governed means responsive to boiler demand and adapted to add to and subtract from the value of the resistance of said control.

3. An automatic feed water regulator for steam boilers comprising the combination of a feed water valve, a Wheatstone bridge, electrically governed means for varying the resistance in the bridge legs in response to boiler demand, and a relay apparatus responsive to the balance and unbalance of the bridge and adapted to control the position of the valve.

4. An automatic feed water regulator for steam boilers comprising the combination of a feed water valve, a Wheatstone bridge, two sets of electrical means of which one is adapted to vary the resistance in the bridge legs in response to flow governed by valve movement and of which the other is adapted to vary the resistance in the bridge legs in response to boiler demand, and relay apparatus responsive to the balance and unbalance of the bridge and adapted to control the position of the valve.

5. In an automatic feed water regulator for steam boilers the combination of apparatus for automatically maintaining a practically fixed ratio between water input and steam output, and means adapted to modify that ratio and responsive to changes in boiler water level.

6. An automatic feed water regulator for steam boilers including valve apparatus and valve actuating means responsive to water input flow and to steam output flow and adapted to automatically maintain a practically fixed ratio between water input flow and steam output flow.

7. In an automatic feed water regulator for steam boilers the combination of feed water input control apparatus constructed and arranged to cause the water input to balance the steam output, and means coacting with said apparatus to prevent water from rising above and falling below predetermined levels in the boiler.

GEORGE F. FENNO.